March 29, 1932.    O. A. ROSS    1,851,448
MOTION PICTURE CAMERA
Filed Sept. 19, 1928
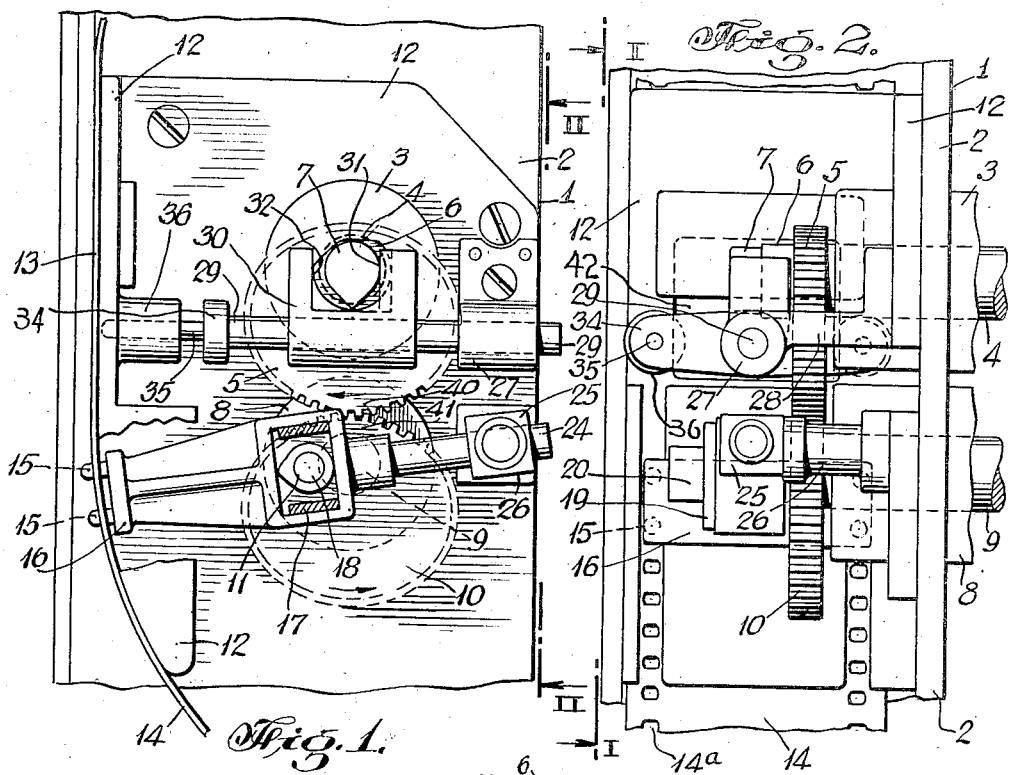
Fig. 1.   Fig. 2.
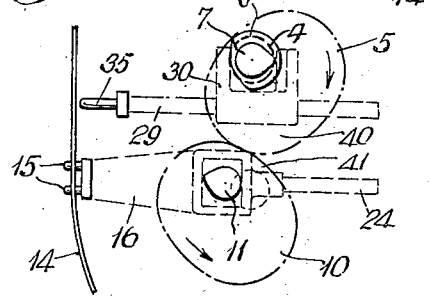 
Fig. 3.
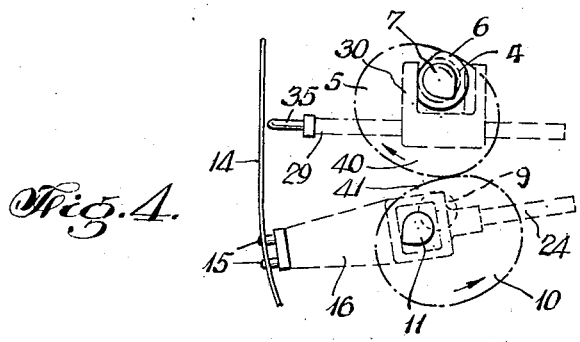
Fig. 4.
INVENTOR
Oscar A. Ross.

Patented Mar. 29, 1932

1,851,448

UNITED STATES PATENT OFFICE

OSCAR A. ROSS, OF NEW YORK, N. Y.

MOTION PICTURE CAMERA

Application filed September 19, 1928. Serial No. 306,915.

This invention refers to motion picture camera mechanism and more particularly to that class of mechanism more generally known as the shuttle mechanism employed for advancing the film in said cameras.

One object of this invention is to furnish a shuttle mechanism wherein the time interval during which the film is stationarily positioned for exposure is comparatively long as compared to the time interval during which said film is being advanced by the shuttle mechanism, whereby the quantity of light employed for the illumination of sets when recording motion picture productions in studios may be reduced, or successful exterior exposures may be made under adverse light conditions.

Other objects and advantages will appear as the description of the invention progresses, and the novel feature of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the apparatus, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and in which:—

Fig. 1 is a plan view showing one embodiment of the invention taken on line 1—1 of Fig. 2 and Fig. 2 is another plan view of the same taken on line 2—2 of Fig. 1, and Figs. 3 and 4 on diagrammatic views showing the operation of the mechanism shown in Figs. 1 and 2.

Referring to Figs. 1 and 2, showing in part a shuttle mechanism unit 1, employed in a motion picture camera of the type more generally known as the Mitchell professional motion picture camera, and to which applicant's improvement has been adapted, to base or bracket member 2, is secured to bearing housing 3, rotatably supporting driven shaft 4 having elliptical gear 5 and cams 6 and 7 formed on the exposed end thereof, also secured to said base member is bearing housing 8 rotatably supporting driven shaft 9 having elliptic gear 10 and cam 11 formed on the exposed end thereof. Base member 2 also supports a film guide bracket 12 positioned to form film groove 13 through which film 14 having perforations 14a is arranged to be moved downwardly by claws, pawls, or pins 15—15, secured to crank 16 reciprocably mounted on crosshead member 17 rotatably supported by stud 18 formed on cam 11, said crosshead member having a plate portion 19, allocated on said stud by nut 20. Crank 16 is also formed with tubular extension 24 reciprocably supported by bearing block 25 pivotally supported by post 26 secured to base 2.

Arranged to reciprocate in boss 27 of bearing bracket 28, secured to base 2, is pilot pin bar 29, supporting cam slide member 30 having cam face 31, arranged to receive impingement of cam 7 to move said bar to the right, and rearwardly thereof, cam face 32 arranged to receive impingement of cam 6 to move said bar to the left.

Pilot pin bar 29 is also formed with a plate member 34 supporting pilot pins 35—35 of known function, said pins operating in bosses 36—36 formed in film guide member 12.

Operation

Referring to Figs. 1, 2, 3 and 4, it will be noted by reference to Figs. 1 and 2 that the toothed portion 40 of gear 5 having maximum radius is in mesh with a toothed portion 41 of gear 10 having minimum radius, and it is assumed pins 15—15 of crank 16 have engaged film perforations 14a and that said crank is moving downwardly having traveled substantially one-half the distance of the portion of the cycle alloted for the advancement of said film.

Referring to Fig. 3, pawls 15—15 are assumed to have just entered film 14 and crank 16 is moving said film downwardly. The toothed portion 40 of maximum radius formed on gear 5 is approaching the toothed portion 41 of minimum radius formed on gear 10 whereby maximum speed of rotation of gear 10 is being effected. It is to be noted that cam 7 has moved cam slide 30 and pilot pin bar to the right whereby pilot pins 35—35 are removed from film perforations 14a—14a.

As gears 5 and 10 are rotated in the direction shown by the arrows, the film engaging end of crank 16 is moved downwardly, thereby advancing film 14 one frame whereafter continued rotation of said gears causes pawls 15—15 to be removed from said film perforations and simultaneously pilot pin bar 29 is moved to the left by cam 6 whereby pilot pins 35—35 are caused to engage said perforation to lock said film against movement while photographic exposure then is being made thereon.

It is to be noted that by having the maximum radius toothed portion 40 of gear 5 meshing with minimum radius toothed portion 41 of gear 10 during the period pawls 15—15 engage film 14 for advancement thereof, said film is advanced in a comparatively small interval of time as compared to the interval during which said pawls are disengaged from said film and said film is stationarily locked in position by pilot pins 35—35.

Whereas in my Patent No. 1,797,274 issued Mar. 24, 1931 the driven gear, as 10 rotates at a constant speed and crank 16 engages film 14 during alternate revolutions, in this improvement the film is engaged during every revolution of said gear, however said gear is rotated.

Whereas applicant's improvement has been shown as applied to a Mitchell camera it is obvious it may be equally well adapted to other known motion picture cameras wherein a crank, as 16, is employed for the advancement of the film as 14.

By adopting applicant's improvement to motion picture cameras the time interval during which the film is advanced may be reduced whereby a 300 degree or greater shutter opening is permitted, such larger shutter openings also permitting reduction in illumination of the sets to be photographically recorded in studios, or such recording under adverse conditions of exterior illumination.

What I claim is:—

1. The combination with a motion picture camera arranged to advance a motion picture film relatively to a photographic aperture therein, of a driving member arranged to be rotated at substantially constant speed, an elliptical gear supported thereby, a driven member arranged to support a film advancing member, an elliptical gear supported thereby arranged to engage the driving member gear whereby the driven member is rotated at comparatively high and low speeds during each revolution thereof, a cam member supported by the driven member for actuating the advancing member so positioned thereon whereby the advancing member will engage the film for advancement during the high rotative speed of the driven member and will be disengaged therefrom during the low rotative speed thereof, and a cam face formed on the cam member arranged to rapidly move the advancing member relative to the film advancing movement thereof as it initially engages the film for the advancement thereof.

2. Film advancing mechanism for motion picture apparatus comprising, a driving member arranged to be rotated at substantially uniform speed having an elliptical gear supported thereby, a driven member having another elliptical gear supported thereby arranged to mesh with the driving gear whereby the driven gear will be rotated through comparatively high and low speeds during each revolution of the driving gear, a film advancing member arranged to engage and advance the film relatively to an aperture, an actuating member for actuating the advancing member operated by the driven member so positioned thereon whereby the advancing member will engage and advance the film during the comparatively high rotative speed thereof and will be disengaged from the film during the comparatively low rotative speed thereof, a locking member arranged in one fixed position to lock the film against movement and in another fixed position to be removed from the path of the movement thereof, and actuating means operable by the driving member for actuating the locking member so positioned thereon whereby the locking member will be positively moved to the fixed locking position for the comparatively long period the advancing member is dis-engaged from the film and will be positively moved to the unlocked position during the comparatively short period the advancing member is engaged with and advancing the film.

3. Film advancing mechanism for motion picture film apparatus comprising, an aperture plate member, an elliptical gear member arranged to be rotated at substantially uniform speed, a driven elliptical gear member arranged to have the gear portion thereof engage the driving gear portion of the driving member whereby the driven member will be rotated at comparatively high and low speeds during each revolution thereof, a film advancing member arranged to engage and advance the film relatively to the aperture of the aperture plate member, actuating means for operating the film advancing member supported by the driven member so positioned thereon whereby the advancing member will be operated to engage and advance the film during the high rotative speed period of the driven member whereby the film will be advanced in a comparatively short period of time and will be disengaged therefrom during the low rotative speed periods thereof whereby the film will be stationarily positioned for comparatively long periods of time, a reciprocable locking member arranged in one position to lock the film against movement and in another position to be disengaged from the film whereby the film may be advanced by the advancing member, and means operated by the driving member for stationarily positioning the locking member in the locked position during the comparatively long periods the advancing member is dis-engaged from the film and positively reciprocating the member between the locked and unlocked positions during the comparatively short periods of time the advancing member is advancing the film relatively to the aperture.

4. Film advancing mechanism for motion picture apparatus comprising, a driven shaft member having an elliptical gear supported thereby arranged to be rotated at substantially uniform speed, a driven shaft member having another elliptical gear supported thereby arranged to mesh with the first named elliptical gear whereby the driven gear is rotated at comparatively high and low rotative speeds during each revolution thereof, a reciprocating locking member mounted to engage and lock the film against movement while a photographic image is being recorded thereonto through a photographic aperture, an advancing member mounted to engage and advance the film relatively to the aperture, cam operating means supported by the driving gear for operating the locking member, and actuating means supported by the driven gear for operating the advancing member so positioned thereon whereby the member is arranged to engage and advance the film during the high rotative speed of the gear and will be dis-engaged therefrom and moved to the advancing position during the low rotative speed thereof.

5. Motion picture apparatus arranged to advance motion picture film relatively to a photographic aperture comprising, a supported member for engaging and advancing the film relatively to the aperture, an actuating member associated with the advancing member for effecting engagement thereof with the film for comparatively short periods of time alternately with disengagement therewith for comparatively long periods of time, the actuating member being arranged to effect advancement of the film by the advancing member during the comparatively short periods of engagement therewith, a supported locking member having a film engaging portion, a multiple faced cam member having one cam face thereof arranged to advance the locking member to engage and lock the film against movement for comparatively long periods of time and the other face thereof arranged to retract the locking member from the film for disengagement therewith for comparatively short periods of time, and means associated with the cam member operatively connected with the actuating member for effecting engagement of the film by the locking member engaging portion during the comparatively long periods the advancing member is disengaged therefrom and disengagement therewith during the comparatively short periods the advancing member is engaged therewith for advancing the film relatively to the aperture.

6. Motion picture apparatus arranged to advance motion picture film relatively to a photographic aperture comprising, film advancing means for simultaneously effecting engagement and advancement of the film relatively to the aperture for comparatively short periods of time alternately with effecting disengagement therewith for comparatively long periods of time whereby the film is stationarily positioned for photographically recording an image thereon through the aperture, a supported locking member having a film engaging portion, a multiple faced cam member having one cam face thereof arranged to advance the engaging portion of the locking member to engage and lock the film against movement for comparatively long periods of time and the other face thereof arranged to retract the locking member from the film for disengagement therewith for comparatively short periods of time, and means associated with the cam member operatively connected with the film advancing means for effecting engagement of the film by the locking member engaging portion during the comparatively long periods the advancing means is disengaged therefrom and disengagement therewith during the comparatively short periods the advancing means is engaged therewith for advancing the film relatively to the aperture.

7. Film advancing mechanism for motion picture apparatus comprising, two rotatively supported elliptical gears arranged to mesh one with the other, two independently mounted pin supporting arms, one operable to lock the film against movement while a photographic image is being recorded thereon, the other arm being operable to engage and advance the film, a multiple faced cam associated with one of the gears arranged to operate the locking arm, and another cam associated with the other gear arranged to operate the film advancing arm.

8. Film advancing mechanism for motion picture apparatus comprising, two rotatively supported elliptical gears arranged to mesh one with the other, two independently mounted pin supporting arms, one operable to lock the film against movement while a photographic image is being recorded thereon through a photographic aperture, the other arm being operable to engage and advance the film relatively to the aperture, a plurality of cams associated with one of the gears each having a differing formed face thereon arranged to operate the locking arm, and an actuating member associated with the other gear arranged to operate the film advancing arm.

9. Film advancing mechanism for motion picture apparatus comprising, two rotatively supported elliptical gears arranged to mesh one with the other, two independently mounted pin supporting arms, one operable to lock the film against movement while a photographic image is being photographically recorded through an aperture, the other arm being operable to engage and advance the film, a plurality of cams associated with one of the gears having differingly formed cam faces thereon arranged to operate the locking arm, and another cam associated with the other gear arranged to operate the film advancing arm.

10. Film advancing mechanism for motion picture apparatus comprising, two rotatively supported elliptical gears arranged to mesh one with the other, two independently mounted pin supporting arms, one operable to lock the film against movement while a photographic image is being recorded thereon through a photographic aperture, the other arm being operable to engage and advance the film relatively to the aperture, an actuating member supported by one of the gears for operating the film advancing arm, and a two faced cam operatively associated with the other gear, one face thereof being arranged to positively move to and fixedly position the locking arm in the locked position for a comparatively long period of time and the other face thereof being arranged to move to and fixedly position the arm in the unlocked position for a comparatively short period of time.

11. Film advancing mechanism for motion picture apparatus comprising, two rotatively supported elliptical gears arranged to mesh one with the other, two independently mounted pin supporting arms, one operable to lock the film against movement while a photographic image is being recorded thereon through a photographic aperture, the other arm being operable to engage and advance the film relatively to the aperture, a cam associated with one of the gears for operating the film advancing arm, and a two faced cam associated with the other gear, one face thereof being arranged to positively move to and fixedly position the locking arm in the locked position for a comparatively long period of time, and the other face thereof being arranged to move to and fixedly position the arm in the unlocked position for a comparatively short period of time.

12. Film advancing mechanism for motion picture apparatus comprising, two rotatively supported elliptical gears arranged to mesh one with the other, two independently mounted pin supporting arms, one being operable to lock the film against movement while a photographic image is being recorded thereonto through an aperture alternately with unlocking the film during the advancement thereof relatively to the aperture, the other arm being operable to engage and advance the film relatively to the aperture during the unlocked periods thereof, means associated with one of the gears arranged to position the locking arm in locked engagement with the film during the photographing periods and in unlocked position therewith during the periods the film is being advanced by the advancing arm, a cross-head member pivotally supported by the other gear arranged to be bodily rotated thereby, the member having sliding faces formed thereon, an opening formed in the film advancing arm having sliding faces engaging the sliding faces of the cross-head member, and means operatively associated with the last named gear engaging the advancing arm arranged to effect relative sliding movement between the cross-head member and the advancing arm upon the bodily rotation of the member by the gear.

13. Film advancing mechanism for motion picture apparatus comprising, two rotatively supported elliptical gears arranged to mesh one with the other, two independently mounted pin supporting arms, one being operable to lock the film against movement while a photographic image is being recorded through an aperture alternately with unlocking the film during the advancement thereof relatively to the aperture, the other arm being operable to engage and advance the film relatively to the aperture during the unlocked periods thereof, a dual faced cam associated with one of the gears arranged to have one face thereof position the locking arm in locked engagement with the film for comparatively long periods while the image is being recorded thereon and the other face thereof being arranged to position the arm in unlocked engagement with the film for comparatively short periods of time while the film is being advanced by the advancing arm, means associated with one of the gears arranged to position the locking arm in locked engagement with the film during the recording periods and in unlocked position therewith during the periods the film is being advanced by the advancing arm, a cross-head member supported by the other gear arranged to be bodily rotated thereby, the member having sliding faces formed thereon, an opening formed in the film advancing arm having sliding faces engaging the sliding faces of the cross-head member, and means operatively associated with the last named gear engaging the advancing arm arranged to effect relative sliding movement between the cross-head member and the advancing arm upon the bodily rotation of the member by the gear.

14. Film advancing mechanism for motion picture apparatus comprising, a movably mounted film locking arm, a pair of rotating cams, one cam being arranged to movably effect fixed engagement of the locking arm with the film for comparatively long periods of time while an image is being photographically recorded thereonto through an aperture, the other cam being arranged to movably effect disengagement of the arm with the film for comparatively short periods of time while the film is being advanced relatively to the aperture, means for rotatably supporting the cams, a movably mounted film advancing arm, an actuating member therefore arranged to effect engagement and advancement of the film thereby for comparatively short periods of time alternately with disengagement therefrom for comparatively long periods of time, and means operatively connecting the cam supporting means and the actuating member arranged to effect engagement of the film by the locking arm during the periods the advancing arm is disengaged therefrom and disengagement therewith during the periods the advancing arm is advancing the film relatively to the aperture.

15. Film advancing mechanism for motion picture apparatus comprising, a movably mounted film locking arm, a pair of rotating cams, one cam being arranged to move the locking arm to one position for engaging and locking the film against movement while an image is being recorded thereonto through an aperture, the other cam being arranged to move the locking arm to another position for disengaging the locking arm from the film while advancement thereof is effected relatively to the aperture, means for rotatively supporting the cams, a movably mounted film advancing arm, an actuating member therefore arranged to effect engagement and advancement of the film thereby alternately with disengagement therefrom, and means operatively connecting the cam rotating means and the actuating member arranged to effect engagement of the film by the locking arm during the periods the advancing arm is disengaged from the film and disengagement therewith during the periods the advancing arm is advancing the film relatively to the aperture.

In testimony whereof I hereby affix my signature.

OSCAR A. ROSS.